May 21, 1935. T. DE ROODE Re. 19,585

SLEEPING CAR

Original Filed June 13, 1924 2 Sheets-Sheet 1

INVENTOR
Trimble de Roode.
by Guttar & Drews
ATTORNEY

May 21, 1935. T. DE ROODE Re. 19,585
SLEEPING CAR
Original Filed June 13, 1924 2 Sheets-Sheet 2
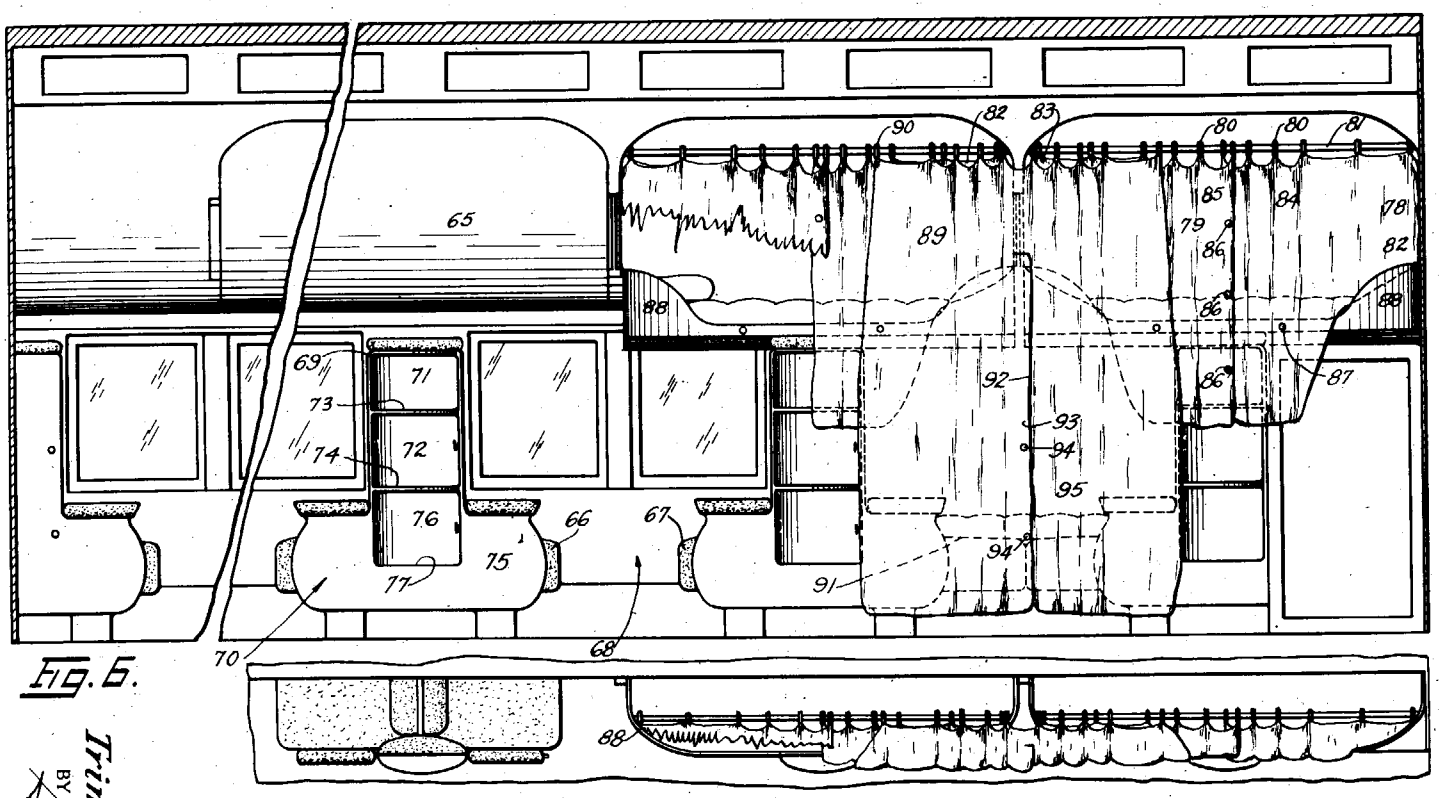
FIG. 6.
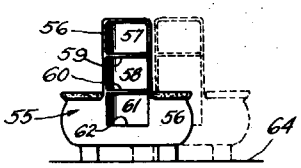
FIG. 5.
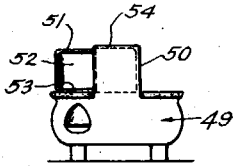
FIG. 4.
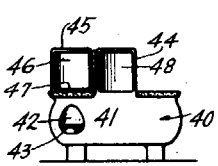
FIG. 3.
FIG. 7.
INVENTOR
Trimble de Roode.
BY Gustav Drews
ATTORNEY Reissued May 21, 1935

Re. 19,585

UNITED STATES PATENT OFFICE 19,585

SLEEPING CAR

Trimble de Roode, New York, N. Y.

Original No. 1,834,093, dated December 1, 1931, Serial No. 719,772, June 13, 1924. Renewed March 20, 1930. Application for reissue August 25, 1933, Serial No. 686,809

32 Claims. (Cl. 105—324)

This invention relates to sleeping cars in general, and more especially to standard sleeping cars having the open berth sections.

Among the objects of the present invention it is aimed to afford greater individual privacy for the upper and lower berths, and to facilitate access to the upper berths. To the aforesaid ends, the present invention more specifically contemplates an arrangement of curtains with the standard open berth sections, whereby the occupants of the upper berths while dressing or undressing behind their curtains are positioned outside of the curtains of the lower berths and vice versa, whereby the occupants of the lower berths while dressing or undressing behind their curtains are positioned outside of the curtains of the upper berths.

The present invention further contemplates the provision of means whereby the occupants of the upper and lower berths of a section may simultaneously be dressing or undressing while adjacent to their berths without intruding upon one another's privacy.

The present invention still further contemplates an arrangement of curtains for the upper and lower berths whereby the portion of curtain for an upper berth disposed behind the curtain for the lower berth is secured at the lower extremity to insure the privacy of the occupant of the upper berth, and similarly, the portion of the curtain of the lower berth disposed behind the curtain of the upper berth is secured adjacent to the lower edge of the upper berth to insure the privacy of the occupant of the lower berth.

As another object of the present invention, it is aimed to provide standing room or head room where the occupant of the lower berth may stand erect outside of the lower berth without intruding upon the privacy of the occupant of the upper berth, and similarly, to provide standing room or leg room where the occupant of the upper berth may stand erect outside of the upper berth without intruding upon the privacy of the occupant of the lower berth.

More specifically, the present invention contemplates, the provision of an individual step formation for each upper berth which preferably forms a permanent part of the car and may be moved into operative position for use throughout the night. To this end, the step formation may be variously arranged such for instance as equipped with a projection disposed below a recess formed in the lateral side supporting section and an auxiliary upper portion having projections disposed below recesses to form steps.

These and other features, capabilities and advantages of the invention will appear from the subjoined detail description of certain embodiments of the present invention illustrated in the accompanying drawings, in which, Figure 1 is a fragmental longitudinal section of a car equipped with one form of the present invention.

Figs. 3, 4 and 5 are modifications respectively of the step portions.

Fig. 6 is a fragmental longitudinal section of a car equipped with one form of the present invention.

Fig. 7 is a fragmental plan showing the modification illustrated in Fig. 6.

Figure 1:
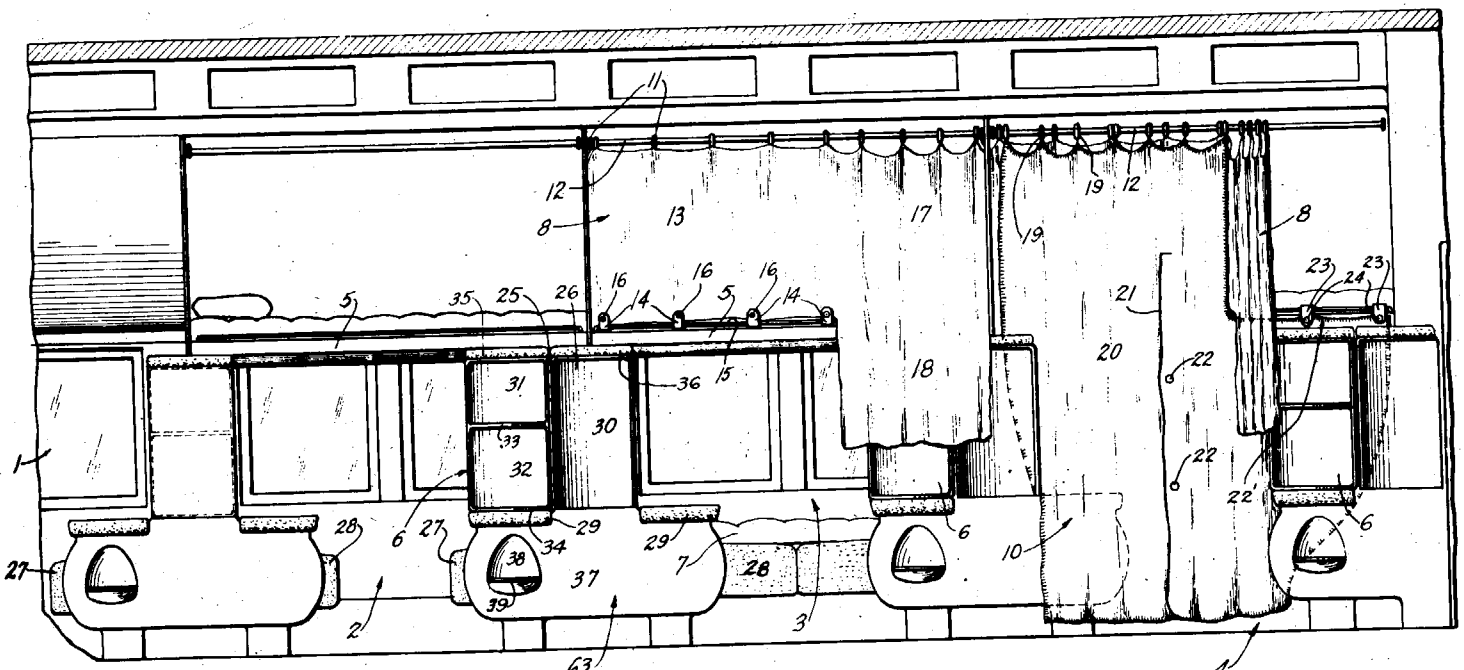
Figure 2:
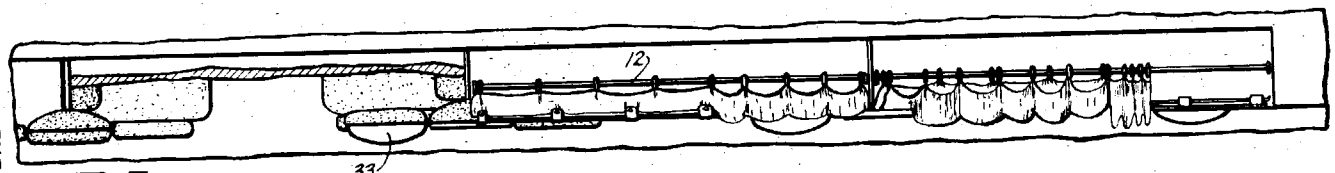
Fig. 2 is a fragmental plan of the modification illustrated in Fig. 1.

The embodiment illustrated in Figs. 1 and 2 is shown as used with a standard car having upper and lower berth sections showing four sections, 1, 2, 3 and 4, section 1 being partly broken away.

Since the several sections are substantially identical with one another, homologous parts will be designated by the same reference character and to facilitate an understanding of the invention, the several sections are shown in different stages of conversion from day use to night use, which on account of the identity of the several sections, will at the same time, illustrate the different stages of conversion from day use to night use of each section, section 1 for instance, being entirely closed up ready for day use; section 2 having only the upper bearth 5 opened up ready for night use without hanging up the curtains, and the step containing housing 6 swung out into opened position ready for night use; section 3 having both the upper and lower berths 5 and 7 respectively, opened up ready for night use with the upper curtain 8 for the upper berth 5 of such section hung up in place ready for night use, and the step containing housing 6 of such section swung out into opened position ready for night use; and section 4 having both the upper berth 5 and the lower berth 7 opened out ready for night use with the upper curtain 8 for the upper berth 5 and the lower curtain 10 for the lower berth 7 of said section both hung up ready for night use, and the step containing housing 6 of such section swung out ready for night use. In such outwardly swung position, the housing 6, of course, forms a partition between the lower berths and the space or room where the legs of a user may be positioned when standing on the steps of such housing 6, the housing 6 thus forming a leg room for the occupant of the upper berth. From the foregoing, it will thus clearly appear that the lower and upper compartments may simultaneously be maintained and used in different stages of conversion according to the use intended for the same and that the users of the respective compartments and of the aisle may thus be fully and adequately protected and protected from one another and from users of the aisle.

With the modification illustrated in Figs. 1 and 2, it is thus seen that the upper and lower berths of the standard sleeping car in use today will remain practically unaltered, the invention relating more or less directly to the curtains and the provision of a step formation for gaining access to the upper berths.

With respect to the arrangement of curtains, the invention contemplates using one portion of the curtain of each berth as a division or partition between such berth and the standing room or leg room for the other berth, and using the other portion of the curtain as the door flap for such berth. To this end the invention specifically contemplates providing securing means for securing one portion of the curtain for a berth to the upper and lower edges of a berth to form the partition, and providing securing means for securing the other portion of the curtain merely at the upper end of such curtain, so that the lower end of such portion may hang loosely and form the door flap for such berth.

As an instance, the upper curtain 8 is substantially L shaped as shown in Fig. 1, and is provided with the usual hooks 11 at its upper edge to engage the supporting rod 12 extending longitudinally of the car, and at the upper ends of the upper berths 5. The partition forming portion of the curtain 8 is the narrow strip 13, and is provided with a suitable fastening means at its lower edge preferably as illustrated, the loops 14 which are bent around the rod 15 secured to the outer edge of the upper berth 5 and fastened in place by suitable buttons 16. The partition portion 13 as a rule extends over a half or a little more than a half of the berth. The other portion of the curtain, 17, is not secured at its lower edge but is preferably provided with an extending portion 18 hanging below the lower edge of the upper berth and part way over the lower berth, to provide a leg covering for the occupant of the upper berth when dressing or undressing, the unsecured portion in addition thereto serving to facilitate the folding back of this portion 17 when used as a door flap during the entrance or egress of the occupant.

The curtain 10 for the lower berth is also provided with hooks at its upper end as for instance the hooks 19 which are secured to the supporting rod 12, but with the curtain 10, only a portion of the upper edge is provided with the hooks 19, which portion for convenience of description may be designated as the door flap portion 20 which hangs loosely down over the lower berth, and is preferably provided with a slit 21 preferably provided with suitable securing means such as the buttons 22 and suitable button holes whereby the opposing edges of the slit 21 may be buttoned together to close the upper flap when desired. The curtain 10 has a lateral extension 22′ which extends below the lower edge of the upper berth 5 over which the portion 18 of the upper curtain 8 overlaps and this extension 22′ is preferably provided with hooks 23 at its upper edge to be secured to and bent around the rod 15 and fastened in place by suitable buttons 24, such extension 22′ forming the partition for the lower berth spacing the lower berth from the leg room for the upper berth. This extension 22′, as illustrated in Fig. 1, preferably extends inside of the step containing housing 6. From the foregoing it will be seen that each curtain forms a partition and a door flap, the curtain 8 having the partition portion 13 separating the upper berth from the head room for the occupant of the lower berth disposed between the partition portion 13 and the door flap portion 20 of the curtain 10, and the curtain 10 having the partition portion 22′ forming leg room for the occupant of the upper berth spacing the lower berth from such leg room, disposed between the partition portion 22′ and the door flap portion 18 of the upper curtain 8.

The step containing housing 6 in the present instance resembles a door member which is pivoted or hinged along one edge as at 25 to one edge of the lateral upright end portion 26 disposed at the lateral edge of the adjacent back rests of two adjacent seats 27 and 28. For the purpose of the present invention it is preferable to provide an end portion 26 that extends substantially to the lower edge of the upper berths 5 as illustrated in Fig. 1. This end portion 26 in the present instance is preferably recessed from its upper edge down to the level of the arm rests 29 as shown by the recess 30. The step containing housing 6 is provided with two recesses 31 and 32 each disposed above a step formation 33 and 34 whereby the step formations 33 and 34 extend inwardly into the recesses 31 and 32, affording a greater area as a foot support for the occupant of the upper berth, without forming an unduly extended step projection. The upper edge of the end portion 26 and the upper edge of the housing 6 are preferably provided with velvet edgings 35 and 36 for engagement with one another when the housing 6 is swung into closed position, to provide a dustproof closure and at the same time afford a sufficiently silent closure, and the velvet edging 35 is provided for yieldable engagement with the curtain extension 22′ or for silent engagement with the under edge of the upper berth 5 should the curtain extension 22′ be omitted.

Beyond one side of the end portions 26, and in the end board 37 of the seats 27 and 28, and preferably disposed below the position of the housing 6 when opened, there is formed a recess 38 and below the recess 38 a step projection 39, which extends partly outside of the recess 38 and beyond the end board 37, and partly into the recess 38 to form an extended supporting area as a foot support to form the first step of the step formation for the occupant of the upper berth.

In Fig. 3, there is illustrated another end member generally designated by the reference character 40, the lower portion or end board 41 of which is substantially identical with the end board 37 of the end member 63 illustrated in Fig. 1, and is also provided with a recess 42 disposed above a step projection 43 substantially identical with the recess 38 and step projection 39 respectively of the modification illustrated in Fig. 1. Above the end board 41, however, the end portion 44 has a less altitude than the altitude of the end portion 26 and as illustrated, is substantially one-half the height of the end portion 26 or just high enough to afford the formation of a single step 47. This end portion 44 has pivoted thereto a step containing housing 45 which is recessed at 46 above the step formation 47, the step formation cooperating with the recess 46 to afford a greater supporting area for the foot of the occupant of the upper berth. The end portion 44 is provided with a recess 48 to receive the step portion 47 when the housing member 45 is swung into closed position, against the end portion 44.

In Fig. 4, still another form of end member is illustrated which is generally designated by the reference character 49. This end member 49 is substantially identical with the end member 40 having a low end portion 50 similar in height to the height of the end portion 44. In this modification, however, the step containing housing consists of a slidable member 51 provided with a recess 52 and a step projection 53 at the lower end thereof. The end portion 50 is provided with a recess 54 slidably to receive the housing member 51, the housing member 51 when slid out into the position shown in Fig. 4 being ready for night use and when slid into the recess 54 of the end portion 50, being moved out of the way for day use.

In Fig. 5 there is illustrated still another form of end member, which is generally designated by the reference character 55. This end member 55 has a portion 56 which has substantially the same height as that of the end portion 26 illustrated in Fig. 1. In this modification, Fig. 5, however, the end portion 56 is provided with a plurality of recesses, to wit, the two recesses 57 and 58 below which there are formed the step projections 59 and 60 respectively. Below the step projection 60, the end board 56 is recessed as illustrated at 61 having a step projection 62 at its lower end. In the form illustrated in Fig. 5, the step formations are fixed relative to the end member 55 and assume the same position for day use as for night use. However, when the end member 55 is used for instance with the arrangement of berths illustrated in Fig. 1 in place of the end member 63 there illustrated, in order properly to position the step formations 59, 60 and 62 to facilitate access to the upper berth from such step formations, it is desirable slidably to mount the end member 55, for instance on a track 64, the dotted line position illustrated in Fig. 5 showing the position of the end member 55 when in day use and the full line position illustrating the position of the end member 55 when ready for night use.

In Figs. 6 and 7 the berths are illustrated in staggered relation to one another with the upper berths overlapping the lower berths, with which arrangement, the curtains and step formations are provided, according to the present invention, that is, an arrangement of curtains and step formations is provided whereby head room is provided for the lower berth spaced from the upper berth, for use of the occupant of the lower berth in the course of dressing and undressing, and leg room is provided for the occupant of the upper berth, spaced from the lower berth without intruding upon the privacy of either berth.

In Fig. 6 the upper berths 65 are substantially standard in construction, and the arrangement of the seats 66 and 67 and consequently of the compartments usable as lower berths, generally designated by the reference character 68, are also substantially standard in construction, the main difference in the arrangement here shown from the standard construction being that the lower and upper berths are staggered in relation to one another with the upper berths overlapping the lower berths. With the modification illustrated in Figs. 6 and 7, it is also desirable to have the end portions 69 of the end members 70 extend up to the level of the lower edges of the upper berths 65. With this staggered relation, the end portions 69 extend up substantially to the middle of the upper berths and consequently when provided with step formations, the end portions 69 are in proper position for access to the upper berths from the step formations, without providing any movable step formations, such as those illustrated and required for the modification illustrated in Fig. 1. The end portions 69 are substantially identical with the end portions 56 of the end members illustrated in Fig. 5, that is provided with two recesses 71 and 72 with step projections 73 and 74 extending from the lower edges of such recesses 71 and 72 respectively, and the end boards 75 of the end members provided with the recesses 76 disposed below the step projections 74 and having step projections 77 extending from the lower edges of the recesses 76.

In this modification, the upper berths are provided with two curtains 78 and 79 which are provided with hooks 80 at their upper ends adapted to be secured to the supporting rods 81 extending along the upper edges of the upper berths 65. The curtains 78 and 79, have the narrow end portions 82 and 83 respectively which form the partitions between the upper berths and the head room for the lower berths. As an instance, the narrow portions 82 and 83 adjacent to one another at adjacent ends of successive upper berths together form the partitions between such adjacent ends of the upper berths and the head room for the lower berth disposed therebelow. These narrow portions 82 and 83 may be secured in place on the rods 81 more or less tightly, functioning as they do, as partitions. The remaining portions or elongated portions 84 and 85 of the curtains 78 and 79 respectively, however, hang loosely, with their lower ends projecting down and extending below the lower edges of the upper berths 65, preferably to form a covering for the leg room of the occupants of the upper compartments. These portions 84 and 85 of a curtain preferably overlap one another and are provided with suitable fastening means such as the buttons 86 cooperating with suitable button holes. It may also be desirable as illustrated in Fig. 6, that suitable fastening means such as buttons 87 be provided on the edges of the upper berths 65 to cooperate with button holes formed in the curtains 78 and 79, in the door flap portions 84 and 85 of the curtains 78 and 79.

The upper berths 65 as illustrated in Fig. 6, preferably have their ends 88 rounded whereby a recess is formed between adjacent rounded portions 88 to form head room for the occupant of the lower berths, such rounded portions 88 cooperating with the partition portions 82 and 83 to form partitions between such head room and the upper berths.

The lower berths are provided with the elongated curtains 89 which are preferably provided with hooks 90 also secured to the rods 81, the curtains 89 as illustrated, extending over the adjacent ends of two successive upper berths, with a half portion of each curtain supported by its hooks 90 overlapping portions of adjacent curtains 78 and 79 of adjacent ends of successive upper berths. The curtains 89 preferably in width extend from the rear edge of one end portion 69 to the forward edge of the succeeding end portion 69 and in length extend from the rods 81 down to and below the bed portions 91 of the lower berths 68. The curtains 89 are also preferably provided with a slit 92 to provide door flaps for the entrance and egress of the occupants of the lower berths, each slit having an overlapping portion 93 provided with button holes to receive the buttons 94 formed in the portion 95 of the curtain 89 disposed below such overlapping portion 93.

It is obvious that various changes and modifications may be made to the details of construction without departing from the general spirit of the invention as set forth in the appended claims.

I claim:

1. In a sleeping car, the combination with upper and lower berths, of step formations for the upper berths associated with the end members of the lower berths, and forming partitions between the lower berths and leg room for the users of the upper berths.

2. In a sleeping car, the combination with upper and lower berths, of step formations for the upper berths, curtains cooperating with the step formations to form partitions between the leg room for the users of the upper berths and the lower berths.

3. In a sleeping car, the combination with upper and lower berths, of step formations for the upper berths associated with the end members of the seats for the lower berths, such step formations comprising step containing housings pivotally connected to the end members, there being recesses formed in the step containing housings and step projections associated therewith.

4. In a sleeping car, the combination with upper and lower berths, of step formations for the upper berths associated with the end members of the seats for the lower berths, such step formations comprising step containing housings pivotally connected to the end members, there being recesses formed in the step containing housings and step projections associated therewith, and there being recesses in the end members to accommodate the step projections when the step containing housings are folded against the end members for day use.

5. In a sleeping car, the combination with upper and lower berths, of end members for the lower berths, step formations for the upper berths associated with the end members of the lower berths, each step formation comprising a step containing housing movable to a position adjacent to the middle of the upper berth.

6. In a sleeping car, the combination with upper and lower berths, of end members for the lower berths, step formations for the upper berths associated with the end members of the lower berths, each step formation comprising a step containing housing movable to a position accessible to the middle of the upper berth.

7. In a sleeping car, the combination with upper and lower berths, of step formations for the upper berths, each step formation being movable from a position adjacent to the end of the berth where it is disposed during the day to a position adjacent the middle of the berth for night use.

8. In a sleeping car, the combination with upper and lower berths, of end members for the lower berths, step formations for the upper berths integral with said end members, each step formation being movable longitudinally of the berth.

9. In a sleeping car, the combination with upper and lower berths, of step formations for the upper berths integral with the lower berths, each step formation being movable from a non-usable position to a usable position relative to the upper berth.

10. The combination with a sleeping car double seat section, of a berth superposed centrally thereof, and a series of fixed steps in the end of the section for access to the superposed berth.

11. In a sleeping car, the combination with upper and lower berths, of end members for the lower berths, and step formations in said end members for the upper berths, said end members being movable into usable and non-usable position for the step formations.

12. In a sleeping car, the combination with upper and lower berths, of end members for the lower berths, and step formations in said end members for the upper berths, said end members being movable longitudinally of the berths to position the step formations.

13. The combination with a sleeping car double seat section having end members including arm rests disposed alongside an aisle, of a superposed berth, steps for said superposed berth extending downwardly of the side of the berth adjacent an end thereof to and below the level of an arm rest adjacent said end, means partitioning said steps from said double seat section, and a curtain for said superposed berth having an openable portion above said steps and having another portion extending laterally of said steps which is substantially fixed in place alongside said berth, the openable portion cooperating with said steps in facilitating access to and from said superposed berth, and the substantially fixed portion cooperating with the openable portion and the steps to restrict such access other than by way of the steps.

14. The combination with a sleeping car double seat section having end members including arm rests disposed alongside an aisle, of a superposed berth, steps for said superposed berth extending downwardly of the side of the berth adjacent an end thereof to and below the level of an arm rest adjacent said end, a curtain for said double seat section having a portion cooperating with said steps and said arm rest to partition said double seat section from the legs of users of said steps and having another portion extending laterally of said steps toward the other arm rest, such latter portion being adapted to allow a user of the double seat section to encroach upon the aisle between said arm rests while behind said latter portion but cooperating with said former portion to restrict such user from intruding upon the availability of said steps for access to and from said superposed berth.

15. The combination with a sleeping car having upper and lower berth spaces disposed alongside an aisle, of steps for each upper berth space disposed alongside the aisle side of a lower berth space adjacent an end thereof, a partition for said upper berth space having an openable portion above said steps for cooperation therewith to facilitate access to and from said upper berth space by way of said steps and having another portion extending laterally of said steps which is secured alongside the berth of the upper berth space for restricting such access other than by way of said steps, and a partition for said lower berth space having an openable portion disposed laterally of said steps for facilitating access to and from said lower berth space and having another portion extending laterally thereof and behind said steps which is secured alongside said upper berth for affording privacy between said steps and said lower berth space and restricting access to said lower berth space other than laterally of said steps, the steps of the upper berth spaces being adapted to be fixed in such position during night use but being movable therefrom for day use of said berth spaces.

16. In a car, the combination of a longitudinally extending aisle, a row of upper and lower compartments disposed alongside said aisle, each lower compartment being overlapped by portions of two upper compartments and being provided with a forwardly facing seat beneath one of such upper compartments and with a rearwardly facing seat beneath the other of such upper compartments, each of such seats extending substantially from the side of the aisle to the side wall of the car, such seats facing each other and being spaced apart for affording access therebetween to and from said aisle, steps for facilitating access between said upper compartments and said aisle, such steps being recessed from said aisle into said row of compartments and being each disposed adjacent the backs of a forwardly facing seat of one lower compartment and the rearwardly facing seat of another lower compartment, and means including devices disposed laterally of said steps and between said aisle and portions of said upper and lower compartments for restricting access to said upper compartments laterally of their respective steps and for restricting access to said lower compartments adjacent said steps.

17. In a car, the combination of a longitudinally extending aisle, a plurality of upper and lower compartments disposed alongside of and in individual access with said aisle, each lower compartment being overlapped by end portions of two upper compartments and being provided with a forwardly facing seat beneath one of such end portions and with a rearwardly facing seat beneath the other of such end portions, such seats facing one another and being spaced apart for affording access between such lower compartment and said aisle, steps for facilitating access between said upper compartments and said aisle, such steps being each disposed adjacent the backs of the forwardly facing seat of one lower compartment and the rearwardly facing seat of another lower compartment, and means including devices disposed upwardly of said seats and between the aisle and the end portions of such upper compartments for protection against dislodgment from said end portions.

18. A sleeping car having an upper berth vertically alined with a lower berth provided with end members therealongside, such berths being conventionally arranged for conversion to day use by closing the upper berth and forming the lower berth into a pair of confronting seats, each adjacent one of said end members, in combination with standing space disposed alongside said berths, a device for protection against dislodgment from said upper berth into said standing space, such device being disposed upwardly of the side of said upper berth but spaced from an end thereof to afford access from said standing space to said upper berth by way of the portion of the side of the upper berth lying between said end and said device, means disposed adjacent one of said end members for facilitating such access, such means including a step disposed at or below the level of the lower berth and a step carrying structure extending upwardly into engagement with the upper berth at said portion of the side thereof, and means for partitioning said structure and standing space from an aisle, such device and structure being adapted to be fixedly maintained in said position during night use.

19. A sleeping car having an upper berth vertically alined with a lower berth, having an end board including an arm rest therealongside adjacent each end thereof, such berths being conventionally arranged for conversion to day use by closing the upper berth and forming the lower berth into a pair of confronting seats, each adjacent one of said arm rests, in combination with standing space disposed alongside said berths, supporting means disposed adjacent the ceiling of the car, a device for protection against dislodgement from said upper berth into said standing space, such device extending upwardly from the side of said upper berth to said supporting means and being spaced from an end of said berth to afford access from said standing space to said berth by way of the portion of the side thereof between said end and said device, a series of steps for facilitating such access, such steps starting from a lower level than the level of one of said arm rests, means for supporting said steps and said latter arm rest including a structure extending up to and in engagement with the side of the upper berth at the said portion of the side thereof, and means for partitioning said structure and standing space from an aisle.

20. In a car, the combination of a longitudinally extending row of longitudinally disposed upper berths alongside an aisle, upper and lower compartments respectively above and below said upper berths, each upper berth having a flight of steps extending downwardly thereof along the aisle side of a lower compartment, a partition enclosing each upper compartment from the aisle and having an openable portion above said flight of steps for cooperation therewith to facilitate access between said upper compartment and the aisle and having a secured portion laterally of said openable portion for restricting such access other than by way of said flight of steps, and a partition enclosing each lower compartment from the aisle and having an openable portion laterally of said flight of steps for affording access between said lower compartment and the aisle and having a secured portion disposed between said flight of steps and the lower compartment for enclosing such lower compartment from said flight of steps and restricting such access other than laterally of said flight of steps.

21. In a car, the combination of a longitudinally extending row of sections alongside an aisle, each section having a longitudinally disposed upper berth dividing such section into an upper and a lower compartment and having a flight of steps disposed alongside the aisle side of said lower compartment for affording access between said upper compartment and the aisle and partitions enclosing said compartments from each other and from the aisle, the portion of said partitions along the aisle side of the upper compartment having an openable portion above said flight of steps for cooperation therewith to facilitate such access and having a secured portion laterally of said openable portion for restricting such access other than by way of said flight of steps, the portion of said partitions along the aisle side of the lower compartment having an openable portion laterally of said flight of steps for affording access between said lower compartment and the aisle and having a secured portion behind said flight of steps for enclosing said lower compartment from said flight of steps and for restricting access directly beneath the openable portion affording access to the upper compartment.

22. In a car, the combination of a longitudinally extending row of sections alongside an aisle, each section having a longitudinally disposed upper berth dividing such section into an upper and a lower compartment having partitions disposed in a substantially vertical position directly alongside said upper berth and cooperating therewith to enclose said compartments from each other and from said aisle and having a flight of steps secured along the aisle side of the lower compartment, the portion of the partitions alongside the upper compartment having an openable portion above said steps for cooperating therewith to afford access between said upper compartment and the aisle and having a secured portion laterally of said openable portion for restricting such access other than by way of said steps, and the portion of the partitions alongside the lower compartment having an openable portion laterally of said steps for affording access between the lower compartment and the aisle and having a secured portion behind said steps for enclosing said lower compartment from said steps and for restricting such access other than entirely laterally of said steps.

23. In a car, the combination of a longitudinally extending row of convertible sections alongside an aisle, each section having a longitudinally disposed upper berth dividing such section into an upper and a lower compartment, the lower compartment having a longitudinally disposed lower berth when converted for night use and having a pair of confronting seats each within an end portion thereof when converted for day use, each section being provided with end members along the end portions of the aisle side thereof for partitioning said seats and end portions from the aisle, such end members being spaced apart centrally of the lower compartment for affording an entrance thereto between its seats, one of the end members of each section terminating upwardly along at least a portion thereof at about the side of the upper berth for affording an entrance to the upper compartment above said portion of the end member and having a flight of steps secured thereto and partitioned thereby from the adjacentmost seat and end portion of the lower compartment, each section having partitions cooperating with said end members for enclosing the upper and lower compartments from each other and from the aisle, such partitions having an openable portion above said flight of steps for cooperation therewith to afford access between the aisle and the upper compartment through the entrance thereof, and having an openable portion laterally of said flight of steps for affording access between the aisle and the lower compartment through the entrance thereof.

24. In a car, the combination of a longitudinally extending row of sections alongside an aisle, each having an upper berth and a convertible lower compartment having a lower berth when converted for night use and having a forwardly facing seat in its rear portion and a rearwardly facing seat in its front portion when converted for day use, the aisle side of said sections having partitions each partitioning the aisle from a forwardly facing seat and a rearwardly facing seat of each two adjacent sections, such partitions being spaced apart along the central portion of each section for affording an entrance thereto between its seats, each partition having a movable portion terminating upwardly along at least a portion thereof at about the side of the upper berth for affording access thereto above such portion and having an associated flight of steps disposed alongside an end portion of the aisle side of the lower compartment and partitioned therefrom by such movable portion, such movable portion being movable to a position alongside another portion of such partition extending alongside an adjacent section for affording the former section greater exposure to the aisle than afforded by the entrance thereof.

25. In a car, the combination of a longitudinally extending row of sections alongside an aisle, each having an upper and a lower berth, a flight of steps disposed along an end portion of the aisle side of the lower berth space, and a partition disposed between said flight of steps and the lower berth space of one section, such partition being movably secured for disposal alongside an adjacent section for affording greater access to the lower berth space of the former section.

26. In a car, the combination of a plurality of sections alongside an aisle, each section having an upper berth, a lower compartment, a flight of steps anchored along the aisle side of the lower compartment, and a partition therefor, such flight of steps being openable and closable for use or non-use in affording access between the upper berth and the aisle and such partition including a portion extending upwardly to the upper berth and partitioning the lower compartment from the flight of steps both when opened and when closed for maintaining privacy between said lower compartment and the flight of steps.

27. In a car, the combination of a plurality of sections alongside an aisle, each section having an upper berth, a lower compartment, a structure including a flight of steps disposed along the aisle side of the lower compartment, and partitions for enclosing the section from the aisle, such partitions having a certain portion between said flight of steps and the lower compartment for affording privacy therebetween and having an openable portion above said flight of steps for cooperation therewith to facilitate access between the upper berth and the aisle, such openable portion extending downwardly of the upper berth along the aisle side of said certain portion and when unopened enclosing a portion of said structure extending upwardly of said steps between said certain and openable portions to within reach of an occupant of the upper berth to control said flight of steps, said flight of steps being openable and closable for use and non-use.

28. In a car, the combination of a plurality of sections alongside an aisle, each section having an upper and a lower compartment, a flight of steps disposed along the aisle side of the lower compartment, and partitions enclosing the compartments from each other and from the aisle, such partitions having a certain portion between said flight of steps and the lower compartment for affording privacy therebetween and having an openable portion above said flight of steps for cooperation therewith to facilitate access between the upper compartment and the aisle, such openable portion extending downwardly along the aisle side of said certain portion and when unopened enclosing an upper step of said flight of steps for cooperation therewith to form an elevated enclosure for the legs of a person immediately entering or leaving said upper compartment.

29. In a car, the combination with a plurality of sections alongside an aisle, each section having an upper berth, a lower compartment, a flight of steps movable into usable and non-usable position and being anchored in proximity to the upper berth along the aisle side of the lower compartment in position to be moved into usable position by an occupant of the upper berth, and a partition including a portion extending upwardly to the upper berth and partitioning the lower compartment from the flight of steps both when disposed in usable position and when disposed in non-usable position for maintaining privacy between said lower compartment and said flight of steps.

30. In a car, the combination of a plurality of sections alongside an aisle, each section having an upper berth openable to divide such section into an upper and a lower compartment, such lower compartment having a pair of confronting seats each within an end portion thereof, a flight of steps disposed along the aisle side of the lower compartment for affording access between the upper compartment and the aisle, and partitions disposed along the end portions of the aisle side of the section for partitioning said seats from the aisle, one of said partitions being disposed behind the flight of steps and extending upwardly thereof to engagement with the upper berth when opened to afford privacy between the adjacentmost seat and a user of said flight of steps, said partitions and flight of steps being supported independently of said upper berth for enabling such upper berth to be closed while such partitions and flight of steps are maintained in place for partitioning said seats from the aisle.

31. In a car having a longitudinal aisle, the combination of a row of lower compartments superposed by a row of upper berths individually openable and closable for use or non-use thereof, such berths when open or closed respectively decreasing or increasing the head room of the lower compartments, each berth when open and ready for use having a flight of steps extending downwardly of the central portion of the aisle side thereof, such flight of steps being individual to such berth and being disposed directly alongside the aisle side of a lower compartment in anchored relation to such berth during night use thereof, such berth also having devices extending upwardly of the aisle side thereof including an openable portion above said flight of steps for cooperation therewith in affording access between said berth and the aisle and including secured portions each disposed laterally of said openable portion for restricting said access other than by way of said flight of steps, such devices being movable for enabling said upper berth to be closed.

32. In a car having a longitudinal aisle, the combination of a row of lower compartments superposed by a row of upper berths individually openable and closable for use or non-use thereof, such berths when open or closed respectively decreasing or increasing the head room of the lower compartments, each berth when open and ready for use having a flight of steps extending downwardly of the central portion of the aisle side thereof, such flight of steps being individual to such berth and being disposed directly alongside the aisle side of a lower compartment in anchored relation to such berth during night use thereof, such berth also having a partition extending upwardly of the aisle side thereof including an openable portion above said flight of steps for cooperation therewith in affording access between said berth and the aisle and including portions each secured to an end portion of the aisle side of such berth for restricting said access other than by way of said central portion and flight of steps, and each lower compartment having a partition for partitioning such compartment from a flight of steps and a user thereof, such partition being disposed between such lower compartment and such flight of steps and extending upwardly into engagement with the central portion of an upper berth when said berth is open for use, said berth being disengageable therefrom for enabling said berth to be closed.

TRIMBLE DE ROODE.